(12) United States Patent
Zwick

(10) Patent No.: US 6,302,466 B1
(45) Date of Patent: Oct. 16, 2001

(54) VIBRATION-DAMPING, NOISE-REDUCING, HEAT-SHIELDING VEHICLE TRIM

(75) Inventor: Evelyn Zwick, Ebmatingen (CH)

(73) Assignee: Rieter Automotive (International) AG, Zollikon (CH)

( * ) Notice: Subject to any disclaimer, the term of this patent is extended or adjusted under 35 U.S.C. 154(b) by 0 days.

(21) Appl. No.: 09/623,758

(22) PCT Filed: Mar. 12, 1999

(86) PCT No.: PCT/CH99/00114

§ 371 Date: Sep. 8, 2000

§ 102(e) Date: Sep. 8, 2000

(87) PCT Pub. No.: WO99/46147

PCT Pub. Date: Sep. 16, 1999

(30) Foreign Application Priority Data

Mar. 12, 1998 (CH) ....................................... 591/98

(51) Int. Cl.⁷ .................................................. B62D 33/00
(52) U.S. Cl. ........................................ 296/39.3; 52/396.08
(58) Field of Search .......................... 296/39.3; 52/396.03

(56) References Cited

U.S. PATENT DOCUMENTS 5,464,592   11/1995   Shah et al. ........................... 181/211

FOREIGN PATENT DOCUMENTS

| | | |
|---|---|---|
| 38 21 468 A1 | 12/1989 | (DE) . |
| 91 07 484.3 | 8/1991 | (DE) . |
| 92 02 228.6 | 4/1992 | (DE) . |
| 41 37 706 A1 | 5/1993 | (DE) . |
| 0 881 423 A1 | 12/1998 | (EP) . |
| 2 694 961 | 2/1994 | (FR) . |

Primary Examiner—Joseph D. Pape
Assistant Examiner—Kiran B. Patel
(74) Attorney, Agent, or Firm—Nath & Associates PLLC; Gary M. Nath; Marvin C. Berkowitz

(57) ABSTRACT

A vehicle lining is disclosed which is used in the area of curved body parts. The vehicle lining has a vibration-damping and heat-shielding action. The vehicle lining has a heat shield which is positioned on an exterior facing side of a vehicle and held Lightly against the curved body part by suitable fixing means. The heat shield of the vehicle lining has a supporting sheet-metal plate and an elastic insulating pad. Vibration damping achieved by the disclosed vehicle lining reduces or eliminates the need for vibration-damping measures at the level of an interior vehicle lining.

19 Claims, 1 Drawing Sheet

VIBRATION-DAMPING, NOISE-REDUCING, HEAT-SHIELDING VEHICLE TRIM

FIELD OF THE INVENTION

The present invention relates to a vibration-damping, heat-shielding vehicle trim 1, together with a heat shield suitable therefor and a car body part suitable therefor.

BACKGROUND OF THE INVENTION

The automobile industry is constantly striving to use space-saving and acoustically effective trims so as to be able not only to increase comfort in the passenger compartment, but also to reduce the noise level in the passenger compartment and the emission of noise to the outside. In particular, there is considerable interest in measures for the effective reduction of the noise pollution inside the vehicle caused inter alia by engine, exhaust or tyre noise.

Thus, for example, an adhesive insulation system is known from EP-A 0 253 376, in which a first covering is applied to the substrate, which covering carries a multi-ply insulating layer acting as an acoustic spring-mass system. A decoupling layer consisting of flexible, predominantly open-cell material is applied to this insulating layer or the heavy layer thereof, a carpet layer consisting of wear layer and underlay being attached in turn to said decoupling layer.

In addition, considerable importance is attached to the use of sound-absorbing heat shields. These are attached between vehicle components which become very hot, e.g. catalysts and/or exhaust pipes, and the vehicle floor, and reflect the heat irradiated by the catalysts and/or the exhaust pipes or insulate the floor from these hot vehicle components.

Heat shields known hitherto therefore consist substantially of a relatively thick formed sheet metal piece with a high heat reflection capacity, preferably of aluminium, to which a heat-absorbing insulating layer provided with a protective foil is applied. The insulating layer used generally consists of ceramic, rock or glass wool or foams or foil assemblies. Such heat shields are described in DE-U-87 00 919.6 or EP-0 439 432, for example.

A known heat shield with sound-absorbing effect is described in Utility Model DE-U-9107484.3, for example. This heat shield comprises a backing sheet of aluminium and includes an insulating layer consisting of a mesh of aluminium filaments. Additional layers within the insulating layer may consist of a foil perforated in the manner of expanded metal and are suitably pleated to form corrugations.

Such heat shields are currently used to reduce the noise level of vehicles. To this end, the heat shield backing sheet is at least partially perforated and the insulating assembly is of open-cell construction, in order to have a simultaneously sound-absorbing effect.

These heat shields are mounted in such a way that the absorbed heat may be dissipated by the air passing between shield and floor panel, i.e. they are spaced from the floor panel. These arrangements are self-supporting and require an extremely stable structure, in order to be able to withstand the considerable vibrations arising in vehicles. In addition, mounting of these heat shields is relatively complex. Such a heat shield is described in U.S. Pat. No. 5,464,952, for example.

The present-day automobile industry endeavours in general to produce trims which are lighter and lower in cost than existing trims while retaining at least the same technical functionality.

SUMMARY OF THE INVENTION

It is therefore the object of the present invention to provide vehicle trim which exhibits the desired functionality of known internal and external vehicle trim but is lighter, less bulky and lower in cost.

In particular, it is intended to provide vehicle trim which has a vibration-damping, heat-shielding and sound-insulating effect and is lighter, less bulky and lower in cost than conventional components.

This object is achieved according to the invention by a vehicle trim ,together with a heat shield and a car body part, and in particular by a vibration-damping, heat-shielding vehicle trim, in which a clampable heat shield backing sheet is clamped against the underside of an arched bodywork part. The insulating assembly of the heat shield may act as a spring between car body part and backing sheet.

The vehicle trim according to the invention is essentially used for arched bodywork parts, in particular in the tunnel along the vehicle floor, and comprises an acoustically effective heat shield. According to the invention, this heat shield is clamped against the car body part in such a way that the vibrations of the car body part are damped by this heat shield. In a preferred embodiment, this heat shield comprises a 0.5 mm thick backing layer of aluminium, a 9 mm thick, resilient insulating assembly of a known type, for example of NOMEX®, and a thin top layer, in particular a 0.05 mm thick aluminium foil. This heat shield is preferably attached to the car body part by clamps or clamping bars, but may also be fixed with other conventional fastening means, for example screws or clips. This attachment ensures that the backing sheet is clamped resiliently to the car body part. In this way, the resilient insulating assembly exhibits a vibration-damping effect between the backing sheet and the car body part, in relation both to the bodywork part and the backing sheet. In a preferred embodiment, the 9 mm thick insulating assembly is compressed to 6 mm. Use of a heat shield clamped on in this way allows the bituminous heavy layer conventionally used in relation to the internal trim to be omitted, or to be reduced in size to a considerable extent.

The advantages of the vehicle trim according to the invention are immediately apparent to the person skilled in sound-and the art. In particular, the direct mounting of the heat-insulating assembly (heat shield) results in vibration damping, which allows the vibration-damping heavy layer of the trim inside the vehicle to be dispensed with at least partially and thus the weight of this internal vehicle trim to be reduced considerably. The at least partial omission of a vibration-damping heavy layer in relation to the internal vehicle trim additionally results in a space-saving, i.e. thinner, construction thereof combined with at least identical acoustic efficiency.

In addition, mounting of the heat shield on the car body part, in accordance with the invention, allows the top layer of the heat shield to be completely omitted and thus further weight to be saved. A further cost saving may be achieved by the omission of special fastening elements, in particular spacers, and the simpler and thus also quicker mounting. In particular the heat shield backing sheet may be thinner, since the heat shield no longer has to be self-supporting and the wear phenomena caused by vibrations are absorbed by the resilient insulating assembly. This resilient construction thus simultaneously ensures that the entire heat shield has a longer service life. Through direct mounting of the heat shield on the underside of the floor panel, the distance between heat shield and heat source is additionally enlarged, which ensures that the heat shield is loaded with less thermal radiation. Furthermore, the sound absorption or sound insulation may be simply optimised by using a backing sheet having more or fewer perforations.

These and other objects, and features and advantages of the invention will be better understood by those skilled n the art by reference to the following detailed description taken together with the following drawings and the appended claims in which like numerals identify like components.

The invention is described in more detail below with reference to an exemplary embodiment and with the aid of the Figures, in which:

Figure 1:
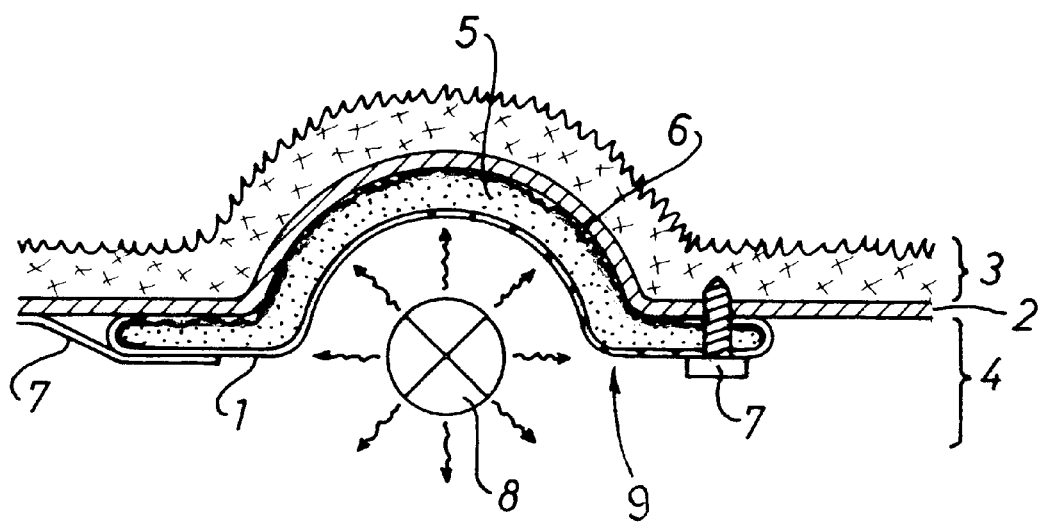
FIG. 1 shows schematically the structure of vehicle trim according to the invention.

The vehicle floor trim structure shown in FIG. 1 comprises an arched car body part 2 with internal trim 3 and external trim 4 comprising a heat shield 9. According to the invention, this heat shield 9 lies against the car body part 2 in such a way that the vibrations of the car body part 2 are damped by this heat shield 9. To this end, the heat shield 9 is clamped resiliently in the arched car body part 2 and coupled resiliently thereto. The pressure produced on the car body part 2 by this heat shield has a vibration-damping effect. The vibration-damping heavy layers generally attached on the passenger compartment side may thus be at least partially omitted.

In a preferred embodiment, the external trim 4 according to the invention is attached in the area of an arched car body part 2. Car body parts 2 arched in this way are generally installed in the floor panel of vehicles and may take any desired form, in particular they may be rounded or angular. It goes without saying that these car body parts 2 are made of metallic or other modern materials. The heat shields 9 clamped according to the invention in the rounded or angular arch of the car body part substantially comprise a backing sheet 1 and a resilient insulating assembly 5. According to the invention, this backing sheet 1 is connected with the car body part 2 in such a way that the resilient insulating assembly 5 is pressed against the car body part 2. This resilient insulating assembly may thus act as a spring between the car body part 2 and the backing sheet 1. All types of thermally and acoustically insulating insulation known in the automobile sector are suitable as insulating assemblies. These preferably consist of a plurality of stacked, perforated, textured aluminium foils, but they may also consist of resilient, porous foams or nonwovens for the purposes of the present invention. Foams or nonwovens suitable for this purpose are sufficiently well known to the person skilled in the art. Such a person will select from these insulating assemblies 5 one which exhibits the best vibration-damping, heat-shielding properties for his/her purposes. It goes without saying that the person skilled in the art also takes note of the resilience or rigidity of the backing sheet 1, when selecting that. Preferred backing sheets 1 and insulating assemblies 5 are made of aluminium, but they may also consist of reinforced plastics or other recyclable materials. Acoustically effective heat shields generally comprise an at least partially perforated backing sheet 1. The person skilled in the art will adapt the arrangement and size of the perforations to the acoustic requirements.

In order to be able to clamp the backing sheet 1 to the car body part 2, in particular the floor panel, in the desired manner, suitable fastening means 7 are provided. Such fastening means 7 likewise sufficiently well known to the person skilled in the art. Screws, clamps and/or clamping bars are particularly suitable. These fastening means 7 allow the backing sheet 1 to be clamped to the arched car body part 2 in such a way that the resilient insulating assembly 5 is compressed slightly between the backing sheet 1 and the car body part 2 and thus couples the bodywork part 2 and the backing sheet 1. It goes without saying that the backing sheet 1 and/or the car body part 2 may be formed in such a way that the backing sheet 1 may be gripped or clamped in the arch of the bodywork part 2 without additional fastening means 7.

The heat shield 9 illustrated comprises, in this embodiment, a 0.5 mm thick backing sheet 1 of aluminium, a 9 mm thick insulating assembly 5 of a known type, for example of NOMEX® (aramid fibres) and a 0.05 mm thick top layer 6 of aluminium. It goes without saying that this top layer may likewise be provided with perforations, or that this top layer 6 may be dispensed with. In a preferred embodiment, this heat shield 9 is clamped with clamping bars 7 against the bodywork part 2. This clamping ensures that the approximately 9 mm thick resilient insulating assembly 5 is compressed to approximately 6 mm.

The absorption capacity of such a sound- and heat-resistant trim structure may be increased considerably if an at least partially perforated sheet is used instead of a normal backing sheet 1. Such perforations allow the sound waves to penetrate into the insulating assembly 5 and leads to increased sound absorption, by means of which the emission of noise to the outside may be reduced considerably. In contrast, a non-perforated backing sheet 1 acts as a sound barrier layer, which substantially reflects back the sound waves impinging upon it. Thus, the insulating effect may be improved with regard to the inside of the vehicle. It goes without saying that the person skilled in the art may optimise the acoustic efficiency of the trim according to the invention by the specific arrangement and dimensioning of the perforations and/or clamping forces.

A significant advantage of this construction according to the invention lies in the vibration damping of the car body part 2, in particular vibration damping of a floor panel. This vibration-damping effect allows the damping measures inside the vehicle to be reduced markedly, i.e. in particular heavy layers may be dispensed with inside the vehicle and thus the total weight of the internal trim 3 may be reduced considerably, without impairing the acoustically insulating properties of the vehicle floor.

In a preferred application, the heat shield 9 is clamped in the area of the car body tunnel and/or additionally fixed with two or four clamps. The spring action of the insulating assembly 5 assists attachment of the heat shield 9. The construction according to the invention thus allows extremely simple mounting of the heat shield according to the invention, even in areas difficult to access. In the simplest embodiment of the trim according to the invention, the internal trim 3 is dispensed with entirely.

What is claimed is:

1. A vibration-damping, heat-shielding vehicle trim in combination with an arched car body part having a surface, said vehicle trim comprising:

an external trim having a heat shield with at least one backing sheet; and a resilient insulating assembly having a first surface and a second surface, said first surface being disposed adjacent said at least one backing sheet;

said at least one backing sheet being coupled to the arched car body part in such a way that at least a substantial portion of said second surface of said resilient insulating assembly contacts the surface of the arched car body part.

2. The vehicle trim according to claim 1, wherein said heat shield is at least partially perforated.

3. The vehicle trim according to claim 1, further comprising means for clamping said heat shield to the arched car body part.

4. The vehicle trim according to claim 1 wherein said heat shield is clampable to the arched car body part.

5. The vehicle trim according to claim 1, wherein said at least one backing sheet is clampable to the arched car body part.

6. The vehicle trim according to claim 1, further comprising means for clamping said at least one backing sheet to the arched car body part.

7. The vehicle trim according to claim 3, wherein the means for clamping the heat shield comprise individual clamps and clamping bars.

8. The vehicle trim according to claim 6, wherein the means for clamping the at least one backing sheet comprise individual clamps and clamping bars.

9. The vehicle trim according to claim 1, wherein the resilient insulating assembly of the heat shield has a sound-absorbing effect.

10. The vehicle trim according to claim 1, wherein said at least one backing sheet is coupled to the arched car body part by being clamped thereto under tension.

11. The vehicle trim according to claim 1, wherein said at least one backing sheet is at least partially perforated.

12. The vehicle trim according to claim 1, whereby a substantial portion of said resilient insulating assembly is compressed between said at least one backing sheet and the car body part.

13. The vehicle trim according to claim 1, wherein said resilient insulating assembly further comprises a top layer.

14. The vehicle trim according to claim 13, wherein said top layer is at least partially perforated.

15. The vehicle trim as claimed in claim 1 wherein said resilient insulating assembly acts as a spring between said at least one backing sheet and the arched car body part.

16. The vehicle trim as claimed in claim 12, wherein said resilient insulating assembly is compressed from a first thickness to a second thickness, the second thickness being less than the first thickness.

17. A vibration-damping, heat-shielding vehicle trim comprising:

an external trim having a surface that can conform to a shape of a least a portion of an arched car body part and having a heat shield with at least one backing sheet;

a resilient insulating assembly having a first surface and a second surface, said first surface being disposed adjacent said at least one backing sheet; and a clamp that can couple said external trim such that said second surface contacts the arched car body part and conforms to the shape thereof.

18. A method for damping vibration and insulating conduction of heat in an arched car body part comprising:

providing a vehicle trim having a heat shield with at least one backing sheet and a resilient heat insulating assembly with a first surface and a second surface, said first surface disposed adjacent said at least one backing sheet, a shape of said vehicle trim generally corresponding to a shape of said arched car body part;

disposing said second surface adjacent the arched car body part so that a substantial portion of said second surface contacts the arched car body part;

flexing said vehicle trim thereby placing said backing sheet under tension; and clamping said backing sheet to the arched car body part thereby compressing said resilient heat insulating assembly between said backing sheet and the arched car body part.

19. The method as claimed in claim 18 further comprising compressing a substantial portion of said resilient heat insulating assembly from a first thickness to a second thickness, wherein said second thickness is less than said first thickness.

* * * * *